US011900574B2

(12) United States Patent
Isono et al.

(10) Patent No.: US 11,900,574 B2
(45) Date of Patent: Feb. 13, 2024

(54) IMAGE PROCESSING SYSTEM AND IMAGE PROCESSING METHOD

(71) Applicant: EVIDENT CORPORATION, Nagano (JP)

(72) Inventors: Kanako Isono, Tokyo (JP); Hirokazu Kubo, Tokyo (JP)

(73) Assignee: Evident Corporation, Nagano (JP)

( * ) Notice: Subject to any disclaimer, the term of this patent is extended or adjusted under 35 U.S.C. 154(b) by 85 days.

(21) Appl. No.: 17/857,562

(22) Filed: Jul. 5, 2022

(65) Prior Publication Data

US 2022/0335582 A1 Oct. 20, 2022

Related U.S. Application Data

(63) Continuation of application No. PCT/JP2020/000814, filed on Jan. 14, 2020.

(51) Int. Cl.
*G02B 21/00* (2006.01)
*G02B 21/36* (2006.01)
*G06T 5/00* (2006.01)
*G06T 7/50* (2017.01)
*G06T 5/40* (2006.01)
*G06T 5/50* (2006.01)

(52) U.S. Cl.
CPC ............ *G06T 5/009* (2013.01); *G02B 21/008* (2013.01); *G02B 21/368* (2013.01); *G06T 5/40* (2013.01); *G06T 5/50* (2013.01); *G06T 7/50* (2017.01); *G06T 2200/24* (2013.01); *G06T 2207/10056* (2013.01); *G06T 2207/20208* (2013.01)

(58) Field of Classification Search
CPC .......................... G02B 21/008; G02B 21/368; G02B 2200/24; G02B 2207/10056; G02B 2207/20208; G02B 5/009; G02B 5/40; G02B 5/50; G02B 7/50
USPC ........................................................... 348/79
See application file for complete search history.

(56) References Cited

U.S. PATENT DOCUMENTS

2015/0362715 A1  12/2015  Kubo
2016/0006939 A1  1/2016  Suzuki
(Continued)

FOREIGN PATENT DOCUMENTS

JP  2011-100204 A  5/2011
JP  2011-205347 A  10/2011
(Continued)

OTHER PUBLICATIONS

International Search Report dated Mar. 10, 2020 received in PCT/JP2020/000814.

*Primary Examiner* — Sherrie Hsia
(74) *Attorney, Agent, or Firm* — Scully, Scott, Murphy & Presser, P.C.

(57) ABSTRACT

The image processing system includes a scanner, a pixelated photon detector (PPD), and at least one processor. The at least one processor displays a setting screen on a display unit. The setting screen is a screen for setting an identification range that is a range of gradation to be identified. The at least one processor displays a second image obtained by converting a first image on the display unit. The second image is an image obtained by converting the first image based on at least the identification range. The first image is generated based on an intensity signal of light detected by a PPD and a scanning position by the scanner.

20 Claims, 9 Drawing Sheets

(56) References Cited

U.S. PATENT DOCUMENTS

| | | |
|---|---|---|
| 2016/0181459 A1 | 6/2016 | Birk et al. |
| 2016/0195705 A1* | 7/2016 | Betzig ................ G02B 27/58 |
| | | 348/79 |
| 2016/0231547 A1 | 8/2016 | Kubo |

FOREIGN PATENT DOCUMENTS

| | | |
|---|---|---|
| JP | 2016-001227 A | 1/2016 |
| JP | 2016-018309 A | 2/2016 |
| JP | 2016-143030 A | 8/2016 |

* cited by examiner

IMAGE PROCESSING SYSTEM AND IMAGE PROCESSING METHOD

CROSS REFERENCE TO RELATED APPLICATIONS

This is a Continuation application of PCT Application No. PCT/JP2020/000814, filed Jan. 14, 2020, which was not published under PCT Article 21(2) in English.

TECHNICAL FIELD

The present disclosure relates to an image processing system and an image processing method, and more particularly, to an image processing system including a pixelated photon detector (hereinafter, referred to as PPD).

BACKGROUND

PPD is a type of multi-pixel avalanche photodiode (APD). PPD has sensitivity to one photon and can obtain an output proportional to the number of photons by operating in Geiger mode.

A microscope system employing PPD is described in, for example, US 2016/0,181,459 A. US 2016/0,181,459 A describes adjusting the output from the PPD by changing the applied voltage.

SUMMARY

An image processing system according to one aspect of the present disclosure includes a scanner, a pixelated photon detector (PPD), and at least one processor. The at least one processor displays a setting screen on a display unit. The setting screen is a screen for setting an identification range that is a range of gradation to be identified. The at least one processor displays a second image obtained by converting a first image on the display unit. The second image is an image obtained by converting the first image based on at least the identification range. The first image is generated based on an intensity signal of light detected by the PPD and a scanning position by the scanner.

An image processing method according to one aspect of the present disclosure includes displaying a setting screen on a display unit, and displaying a second image obtained by converting a first image on the display unit. The setting screen is a screen for setting an identification range that is a range of gradation to be identified, the first image is generated based on an intensity signal of light detected by a pixelated photon detector (PPD) and a scanning position by a scanner, and the second image is an image obtained by converting the first image based on at least the identification range.

BRIEF DESCRIPTION OF DRAWINGS

The present invention will be more apparent from the following detailed description when the accompanying drawings are referenced.

DESCRIPTION

As described in US 2016/0,181,459 A, even when PPD is employed in a photodetector, the gain in the photodetector can be adjusted by adjusting the applied voltage. This point is similar to the case where a photomultiplier tube (PMT) is employed as the photodetector.

Therefore, even in the microscope system employing the PPD, the contrast of the image can be adjusted by adjusting the voltage applied to the photodetector similarly to the conventional microscope system employing the PMT. In the case of PMT, when the gain in the photodetector is adjusted by changing the applied voltage, the signal and noise levels change, but the S/N does not change. However, in the case of PPD, when the gain in the photodetector is adjusted by changing the applied voltage, the noise level changes more than the signal changes, and as a result, the S/N also changes.

Based on the above circumstances, embodiments of the present invention will be described below.

Figure 1:
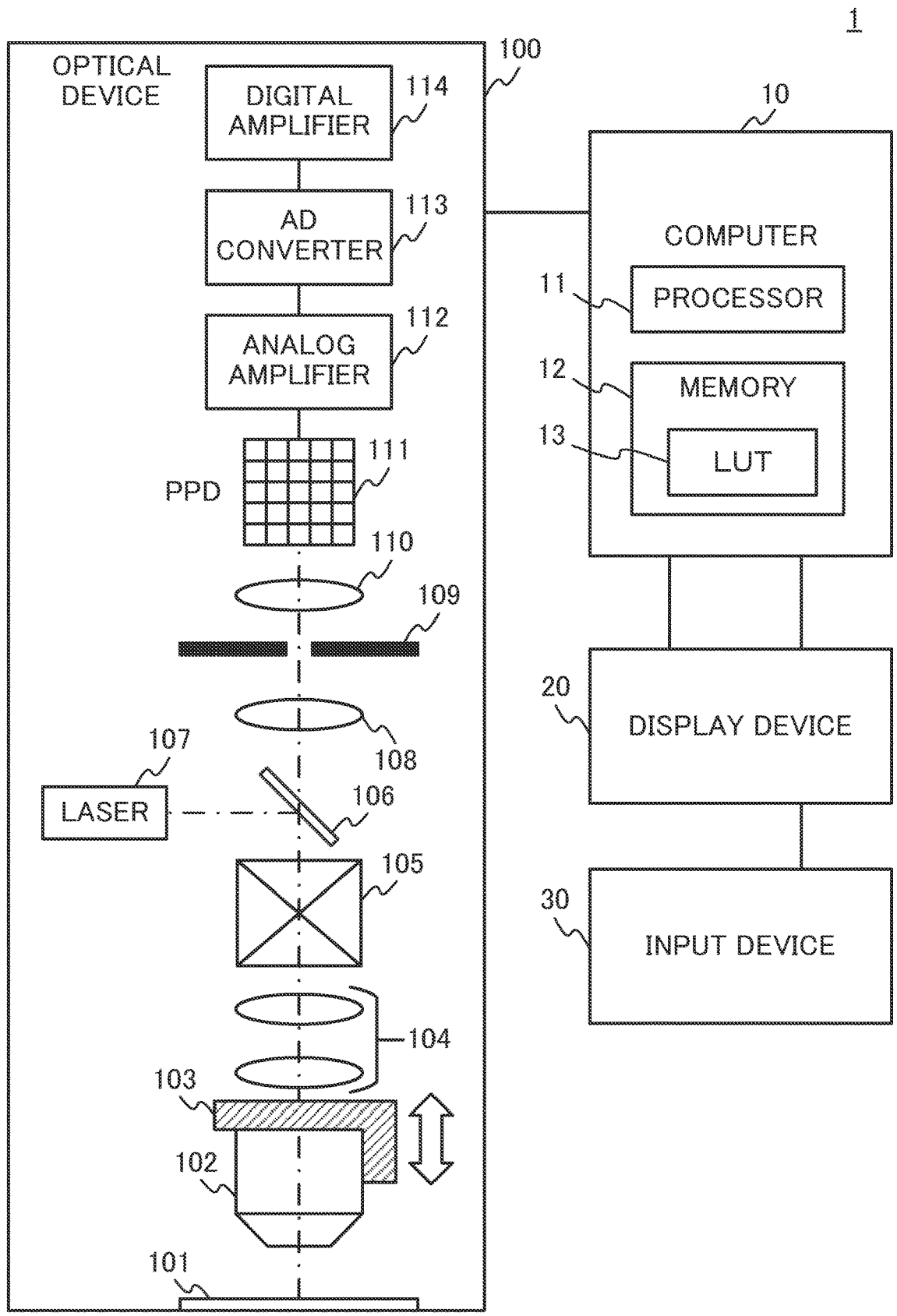
FIG. 1 is a diagram illustrating a configuration of an image processing system 1 according to an embodiment.
Figure 2:
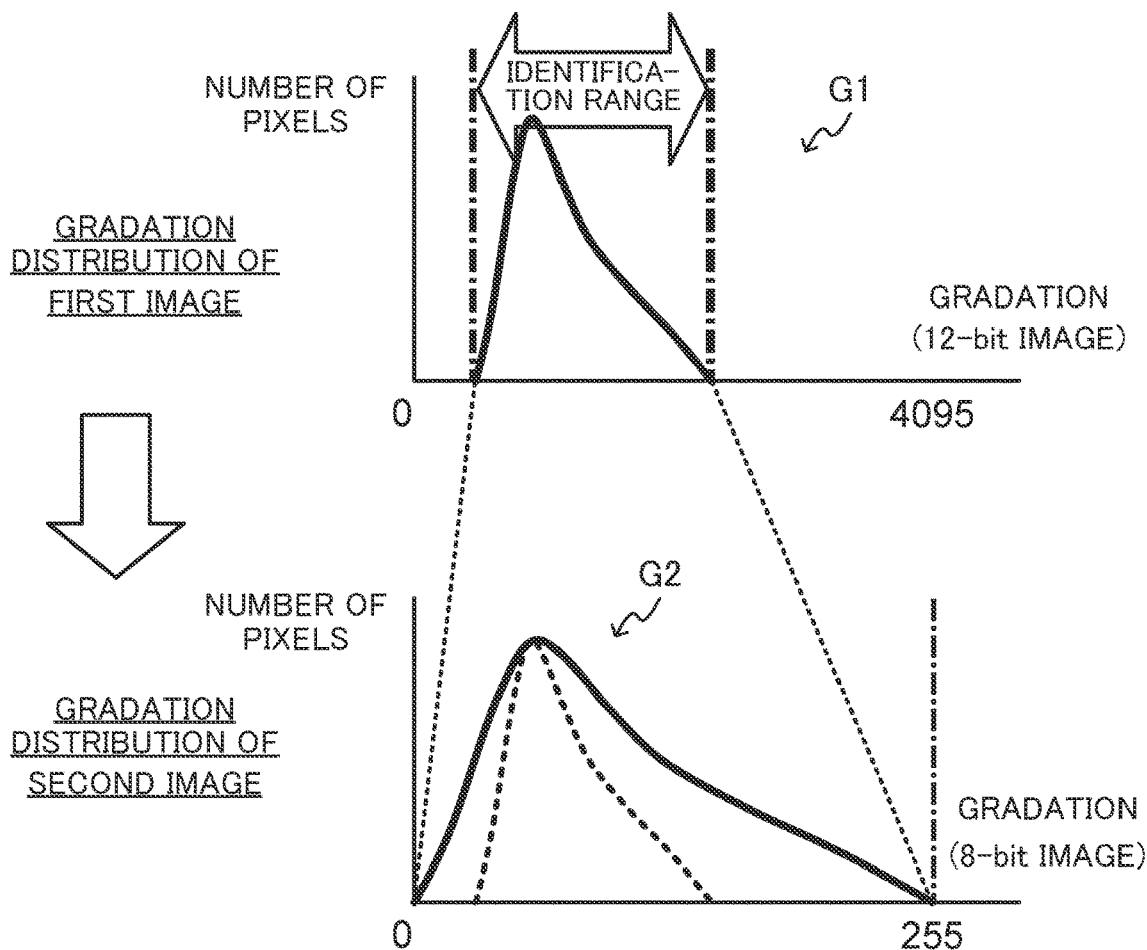
FIG. 2 is a diagram for describing gradation conversion using a lookup table (LUT)

FIG. 1 is a diagram illustrating a configuration of an image processing system 1 according to an embodiment. FIG. 2 is a diagram for describing gradation conversion using a lookup table (LUT). Hereinafter, the image processing system 1 will be described with reference to FIGS. 1 and 2.

As illustrated in FIG. 1, the image processing system 1 includes an optical device 100, a computer 10 connected to the optical device 100, and a display device 20 and an input device 30 connected to the computer 10. The optical device 100 is, for example, a main body of a laser scanning microscope, and the image processing system 1 is, for example, a laser scanning microscope system.

The optical device 100 includes a scanner that scans a sample with light and a PPD 111 that operates in Geiger mode. The computer 10 adjusts the contrast of the image generated based on the intensity signal of the light detected by the PPD 111 and the scanning position of the scanner using the LUT, and displays the image with the adjusted contrast on the display device 20. Furthermore, the computer 10 may control the optical device 100 based on information input by the user using the input device 30. Hereinafter, each configuration of the image processing system 1 will be described in more detail.

In the optical device 100, a scanning unit 105 scans a sample on a stage 101 with the laser light emitted from a laser 107, and the PPD 111 detects light from the sample incident via a confocal optical system including a confocal aperture 109. Then, the optical device 100 outputs the intensity signal of the light from the sample detected by the PPD 111 and the scanning position by the scanning unit 105 to the computer 10.

The optical device 100 includes the stage 101, an objective lens 102, a focusing device 103, a relay optical system 104, the scanning unit 105, a beam splitter 106, the laser 107 as a light source, a tube lens 108, the confocal aperture 109, a lens 110, and the PPD 111. The optical device 100 further includes an analog amplifier 112, an AD converter 113, and a digital amplifier 114.

The laser light emitted from the laser 107 and reflected by the beam splitter 106 enters the objective lens 102 via the scanning unit 105 and the relay optical system 104. The beam splitter 106 is, for example, a dichroic mirror that reflects laser light. The objective lens 102 condenses the laser light on the sample arranged on the stage 101 to form a light spot on the sample.

In the sample irradiated with the laser light, the fluorescent substance is excited, and fluorescence having a wavelength different from that of the laser light is emitted. The fluorescence is transmitted through the beam splitter 106 incident via the objective lens 102, the relay optical system 104, and the scanning unit 105, and is condensed on the confocal aperture 109 by the tube lens 108. In the confocal aperture 109, a confocal pinhole is formed at a position optically conjugate with the focal position on the front side (sample side) of the objective lens 102. Therefore, the fluorescence generated at a position other than the position where the light spot is formed is blocked by the confocal aperture 109, and only the fluorescence generated at the position where the light spot is formed passes through the confocal aperture 109 and is detected by the PPD 111 via the lens 110.

The PPD 111 that has detected the light from the sample outputs an intensity signal corresponding to the number of incident photons. The intensity signal output from the PPD 111 is amplified by the analog amplifier 112 and the digital amplifier 114 before and after sampling by the AD converter 113. The optical device 100 outputs the intensity signal amplified by the analog amplifier 112 and the digital amplifier 114 and the scanning position corresponding to the intensity signal to the computer 10.

The scanning unit 105 includes at least one set of scanners that scan samples in directions orthogonal to each other. The scanning unit 105 may include, for example, two galvanometer scanners, or may include a galvanometer scanner and a resonant scanner. Note that the scanners included in the scanning unit 105 are not limited to the galvanometer scanner and the resonant scanner. Any other optical deflector such as an acousto-optic deflector (AOD) may be employed in the scanner as long as it is configured to scan the sample while deflecting the light. By changing the swing angle of the scanner, thereby changing the direction of deflecting the laser light, it is possible to change the angle of the laser light with respect to the optical axis in the pupil plane of the objective lens 102. As a result, the position of the light spot can be moved in a direction orthogonal to the optical axis of the objective lens 102. By controlling the scanning unit 105 in response to an instruction from the computer 10, the optical device 100 can scan the sample two-dimensionally with the laser light, and can acquire information necessary for constructing a two-dimensional image of the sample.

The computer 10 includes at least one processor 11 and at least one memory 12, and generates an image of a sample based on the intensity signal output from the optical device 100 and a scanning position corresponding to the intensity signal. Note that, hereinafter, an image generated based on the intensity signal and the scanning position is referred to as a first image as necessary, and is distinguished from an image generated by the computer 10 further performing image processing on the first image.

The at least one memory 12 stores a LUT 13 for adjusting contrast of an image. The at least one processor 11 is configured to perform at least first display processing of displaying a setting screen for setting the LUT 13 on the display device 20, and second display processing of displaying, on the display device 20, a second image for display in which gradation of the first image has been converted using the LUT 13. Furthermore, the at least one processor 11 may be configured to perform gradation conversion processing of converting gradation of each pixel constituting the first image using the LUT 13 to adjust contrast.

The processor 11 may perform the above-described processing by executing software stored in the memory 12, may perform the above-described processing by hardware processing, or may perform the above-described processing by a combination of software processing and hardware processing. The software executed by the processor 11 is stored in a computer-readable medium. The processor 11 may include any electrical circuitry and include at least one of circuitry that processes digital signals and circuitry that processes analog signals. The processor 11 includes, for example, one or more integrated circuits (ICs) on a circuit board, and may further include one or more electronic components. The integrated circuit may be, for example, a central processing unit (CPU), a graphics processing unit (GPU), a digital signal processor (DSP), or the like. The integrated circuit may be an application specific integrated circuit (ASIC), a field-programmable gate array (FPGA), or the like.

The memory 12 includes a computer-readable medium storing software to be executed by the processor 11. Note that, in this specification, the computer-readable medium is a non-transitory computer-readable medium. The memory 12 may include, for example, one or more optional semiconductor memories and one or more other storage devices. The semiconductor memories include, for example, a volatile memory such as a random access memory (RAM), and a nonvolatile memory such as a read only memory (ROM), a programmable ROM, and a flash memory. The RAM may include, for example, a dynamic random access memory (DRAM), a static random access memory (SRAM), and the like. The other storage device may include, for example, a magnetic storage device including, for example, a magnetic disk as a computer-readable medium, an optical storage device including, for example, an optical disk as a computer-readable medium, and the like.

The first display processing performed by the processor 11 is processing of displaying a setting screen for setting an identification range from a range of gradation that can be taken by the first image. The identification range is a range of gradation to be identified. The range of gradation that can be taken by the first image depends on how many bits each pixel constituting the image is represented, that is, the number of bits of each pixel constituting the first image. For example, when the number of bits of each pixel constituting the first image is 12 bits, since the pixel of the first image can take 4096 gradations from 0 to 4095, the processor 11 displays a setting screen for setting an identification range from 0 to 4095 on the display device 20.

The gradation conversion processing performed by the processor 11 is processing of generating a second image to be displayed on the display device 20 by converting the first image based on at least the identification range. Specifically, the processor 11 first creates the LUT 13 based on the set identification range, and stores the LUT 13 in the memory 12. Specifically, the processor 11 stores information in which an input gradation range having an identification range is associated with an output gradation range calculated by the number of bits of each pixel constituting the second image in the memory 12 as the LUT 13. Specifically, for example, when the first image is a 12-bit image, the second image is, for example, an 8-bit image matched with the display gradation range of the display device 20, and the set identification range is from 1000 to 2000, information in which the input gradation range of 1000 to 2000 and the output gradation range of 0 to 255 are associated with each other is stored in the memory 12 as the LUT 13. Note that, although the case of displaying in grayscale is as described above, in the case of displaying in color, the second image is a 24-bit image including 8 bits of each of RGB. For example, in the case of red single color, information in which R is associated with an output gradation range of steps 0 to 255, G is all associated with 0, and B is all associated with 0 with respect to an input gradation range of steps 1000 to 2000 is stored in the memory 12 as the LUT 13. In the case of a mixed color such as yellowish green, information in which R is associated with an output gradation range of steps 0 to 123, G is associated with an output gradation range of steps 0 to 255, and B is all associated with 0 with respect to an input gradation range of 1000 to 2000 is stored in the memory 12 as the LUT 13. Thereafter, the processor 11 generates the second image that is the output image by performing gradation conversion on the gradation of each pixel of the first image that is the input image using the LUT 13. That is, the first image is converted into the second image based on the LUT 13.

The second display processing performed by the processor 11 is processing of displaying the second image obtained by converting the first image based on at least the identification range on the display device 20. As a result, for example, as illustrated in FIG. 2, since the gradation range included in the image is converted from the range indicated by the graph G1 to the range indicated by the solid line of the graph G2, it is possible to obtain the second image having a wider dynamic range than the case where the gradation range of the image is simply projected on the display gradation range of the display device 20 (dotted line of the graph G2). Note that the dynamic range of the image is expressed by using a ratio between a maximum gradation and a minimum gradation of pixels constituting the image.

The display device 20 is an example of a display unit of the image processing system 1. The display device 20 is, for example, a liquid crystal display, an organic EL display, a cathode ray tube (CRT) display, or the like. For example, a setting screen is displayed on the display device 20. The input device 30 is an example of an input unit of the image processing system 1. The input device 30 outputs an operation signal corresponding to a user's operation to the computer 10. The input device 30 is, for example, a keyboard, but may include a mouse, a joystick, a touch panel, a stylus, and the like.

In the image processing system 1, the PPD 111 is used as a photodetector. The PPD 111 has a multi-pixel structure in which pixels having sensitivity to one photon are connected in parallel, and has a light receiving surface in which a plurality of pixels are arranged. The number of photons that can be detected by one pixel is about one photon per unit time, but the PPD 111 has a multi-pixel structure, so that it is possible to obtain an output proportional to the number of photons incident on the light receiving surface. Therefore, the image processing system 1 can detect up to a certain number of photons without saturation while detecting weak light of one photon, and can cope with high resolution and a wide dynamic range. Specifically, for example, it is possible to achieve both high resolution and a wide dynamic range by setting an applied voltage so as to obtain a gradation output when one photon is detected per several psec in consideration of fading of the fluorescent dye of the sample. Therefore, according to the image processing system 1, it is possible to obtain an image having high resolution and a wide dynamic range.

In addition, in the image processing system 1, a new image whose contrast is adjusted by digital conversion using the LUT 13 is generated. Therefore, it is not necessary to change the voltage applied to the photodetector for the purpose of contrast adjustment. Therefore, since the applied voltage can be kept constant, the contrast of the image can be adjusted to have a wider contrast while avoiding the fluctuation of the noise level due to the change of the applied voltage. Note that examples of the noise caused by the change of the applied voltage include dark count, crosstalk, and after-pulse.

The image processing system 1 including the PD 111 can also be used as a photon counter. In the image processing system 1, by keeping the voltage applied to the PPD 111 constant, the level of the intensity signal for one photon can be kept constant, so that the accuracy of photon counting can be easily maintained.

Further, in the image processing system 1, a setting screen for setting an identification range is displayed on the display device 20. Therefore, by setting an arbitrary gradation range desired by the user as the identification range and expanding the identification range to the maximum gradation range, an image with high contrast can be easily obtained.

As described above, according to the image processing system 1, by performing the digital image processing using the LUT 13 instead of changing the voltage applied to the photodetector, it is possible to easily adjust the contrast of the image while enjoying various advantages obtained by employing the PPD 111.

On the other hand, in the conventional image processing system employing the PMT as the photodetector, a method of adjusting the applied voltage is conventionally employed as a method of adjusting the contrast of the image. This is because, in the PMT, it is difficult to achieve both a wide dynamic range and resolution at the level of one photon, and thus, adjustment of the applied voltage has been originally performed for the purpose of adjusting the balance between the dynamic range and the resolution. That is, in the conventional image processing system, in a case where the contrast is adjusted using the applied voltage, the balance adjustment and the contrast adjustment can be performed by a single operation, whereas in a case where the contrast is adjusted using the LUT, the use of the LUT is avoided because the balance adjustment and the contrast adjustment are performed as separate operations.

Even when the PPD is employed for the photodetector, a method of adjusting the contrast of the image by changing the applied voltage is usually employed. The system described in US 2016/0,181,459 A is just a specific example thereof. On the other hand, as a result of intensive studies on a contrast adjustment method in consideration of the characteristics of PPD, the applicant of the present application has found that it is desirable to perform contrast adjustment by a method different from PMT, and in particular, it is desirable to perform contrast adjustment using a LUT.

As another method of adjusting the contrast of the image, for example, a method of providing a circuit for adjusting an analog gain in the optical device 100 is considered. However, in order to sufficiently adjust the contrast by this method, it is necessary to use a variable resistor, but the variable resistor generally has a larger temperature coefficient of resistance than a fixed resistor. Therefore, it is difficult to adjust subtle contrast by this method.

Hereinafter, a specific example of processing using the above-described image processing system 1 will be described.

First Embodiment

Figure 3:
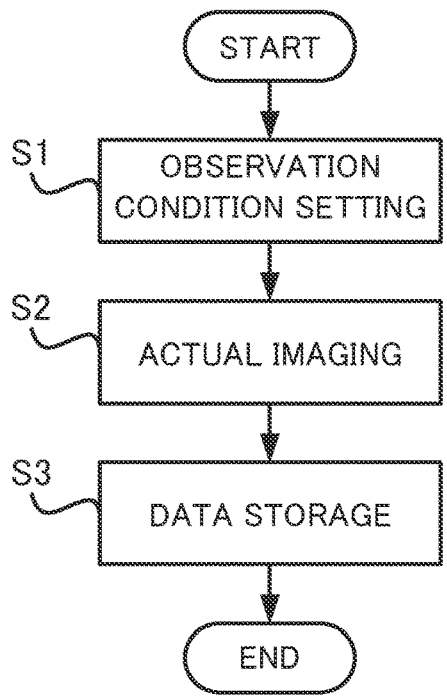
FIG. 3 is a flowchart of processing according to a first embodiment performed by the image processing system 1.
Figure 4:
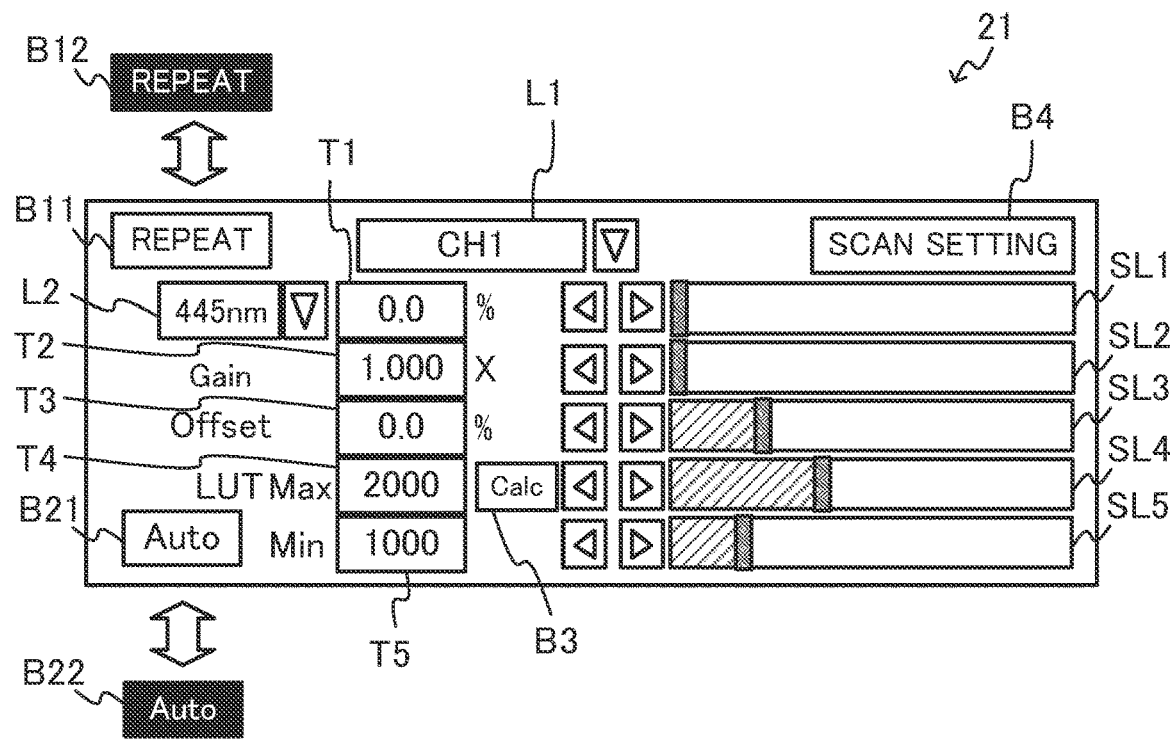
FIG. 4 is a diagram illustrating an example of a setting screen.
Figure 5:
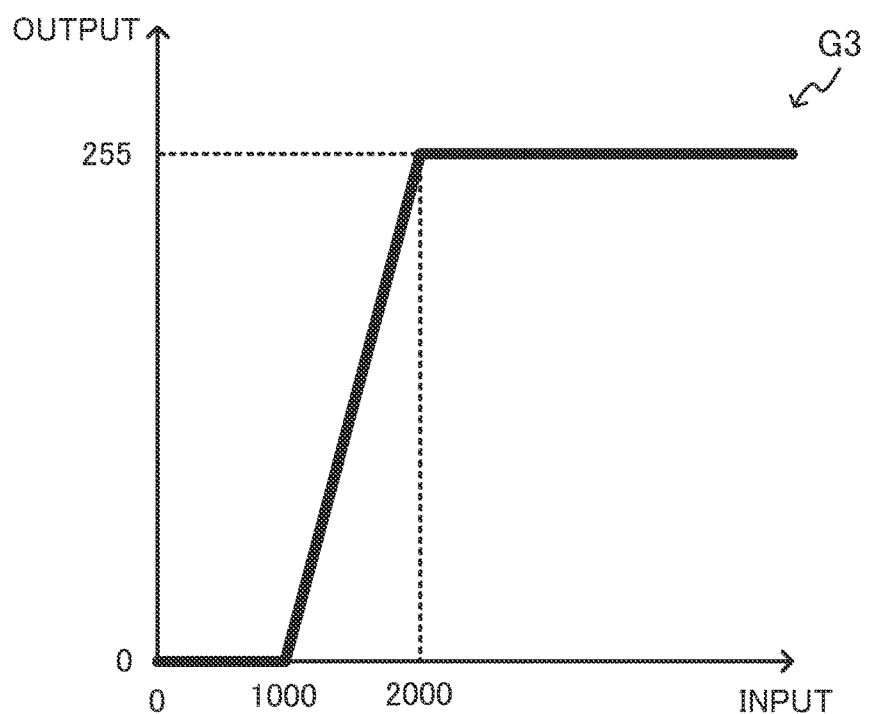
FIG. 5 is a diagram illustrating an example of a relationship between an input gradation and an output gradation of a LUT.
Figure 6:
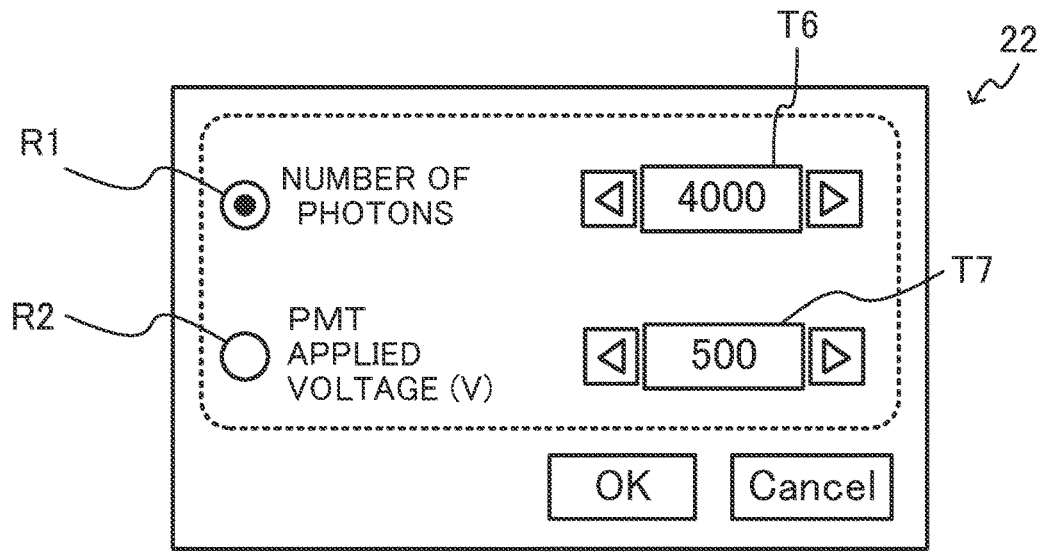
FIG. 6 is a diagram illustrating an example of a screen for inputting information for calculating a recommended value.
Figure 7:
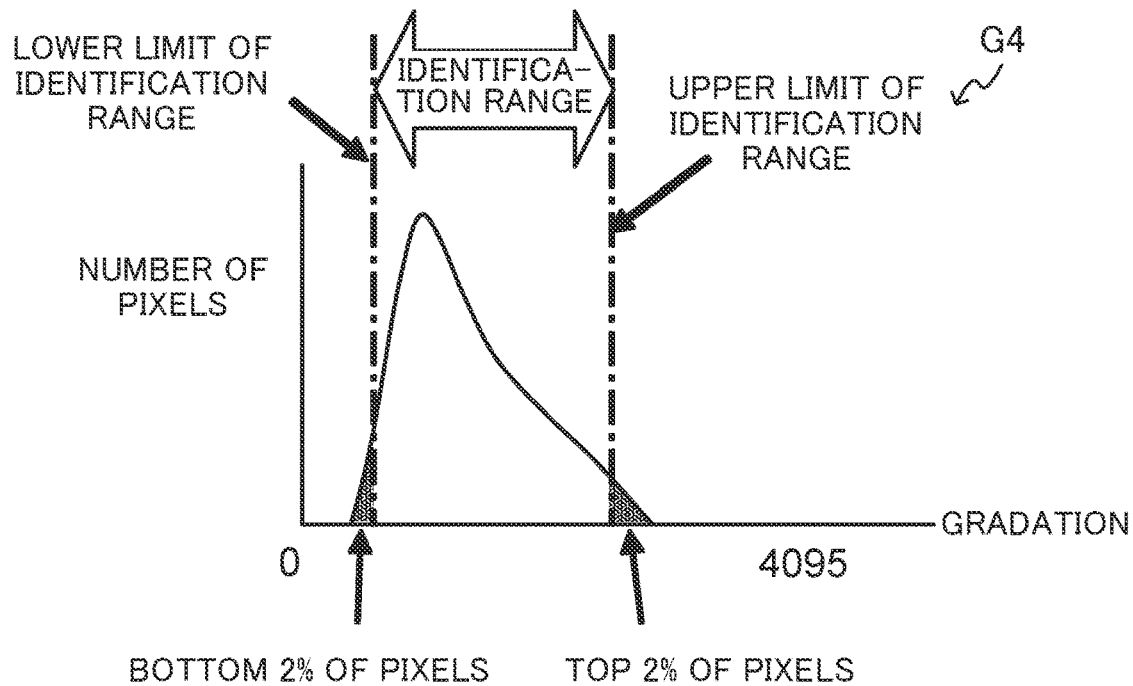
FIG. 7 is a diagram for describing an example of a method of calculating an identification range from a histogram.
Figure 8:
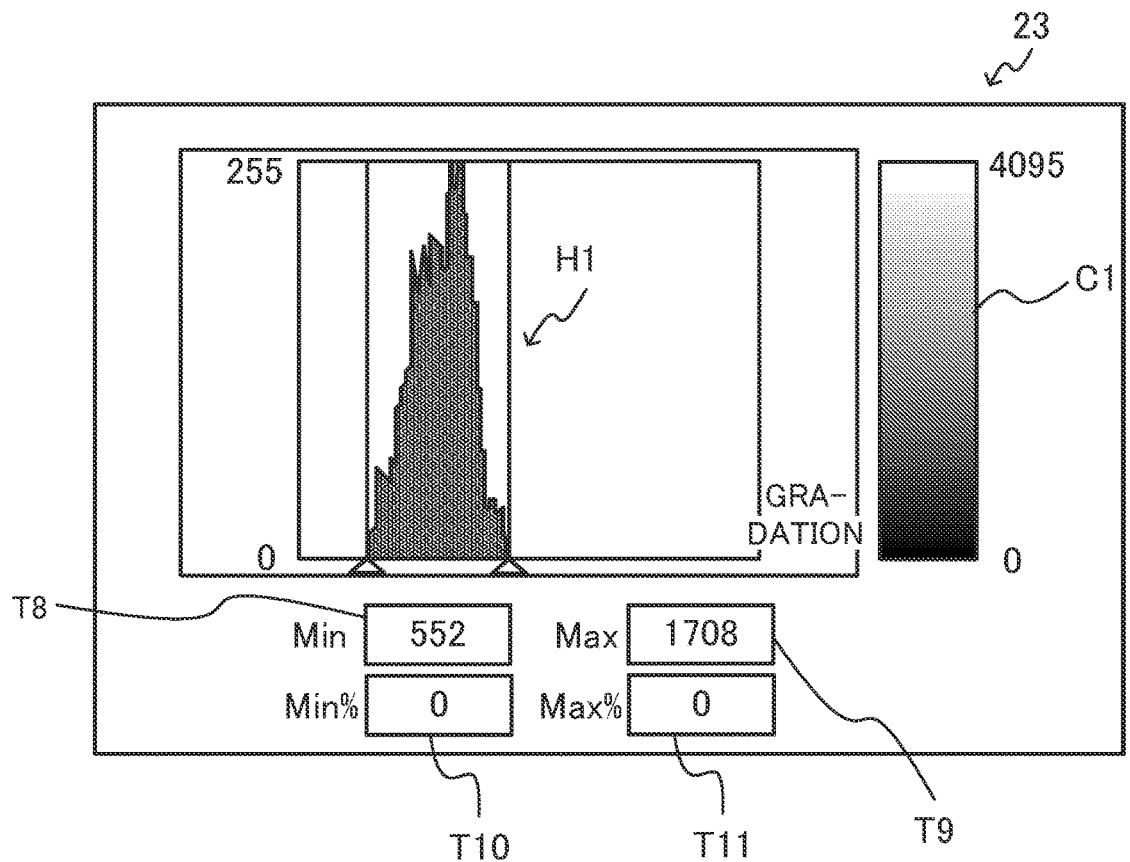
FIG. 8 is a diagram illustrating an example of a screen for inputting information for setting invalid pixels.
Figure 9:
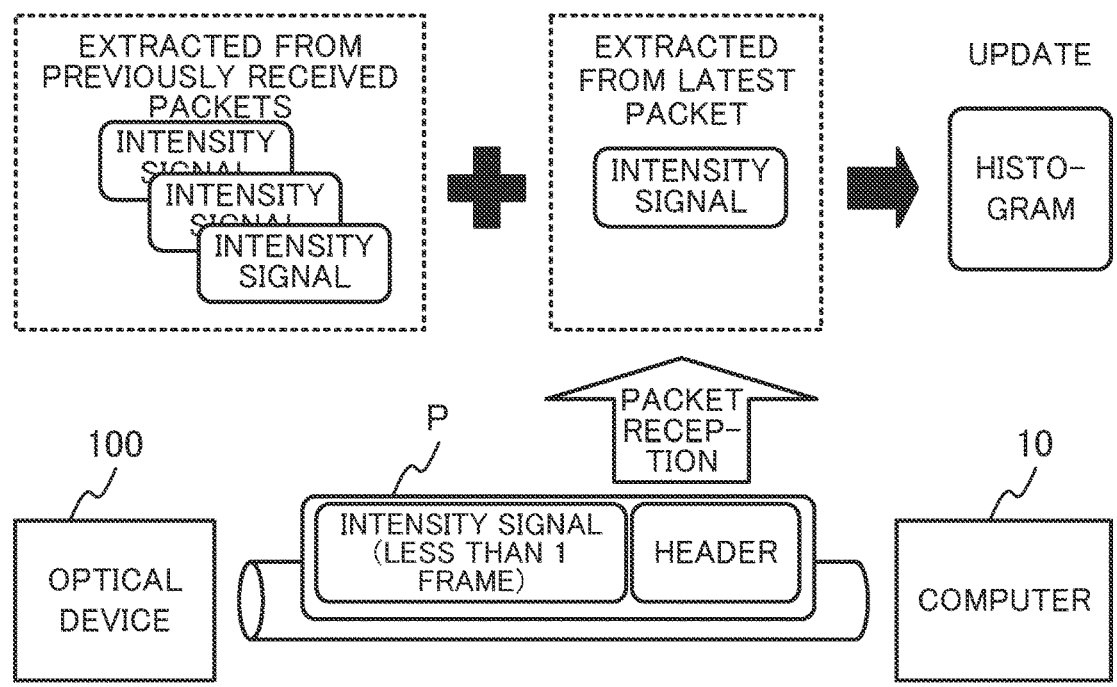
FIG. 9 is a diagram for describing an example of a method of updating a histogram.
Figure 10:
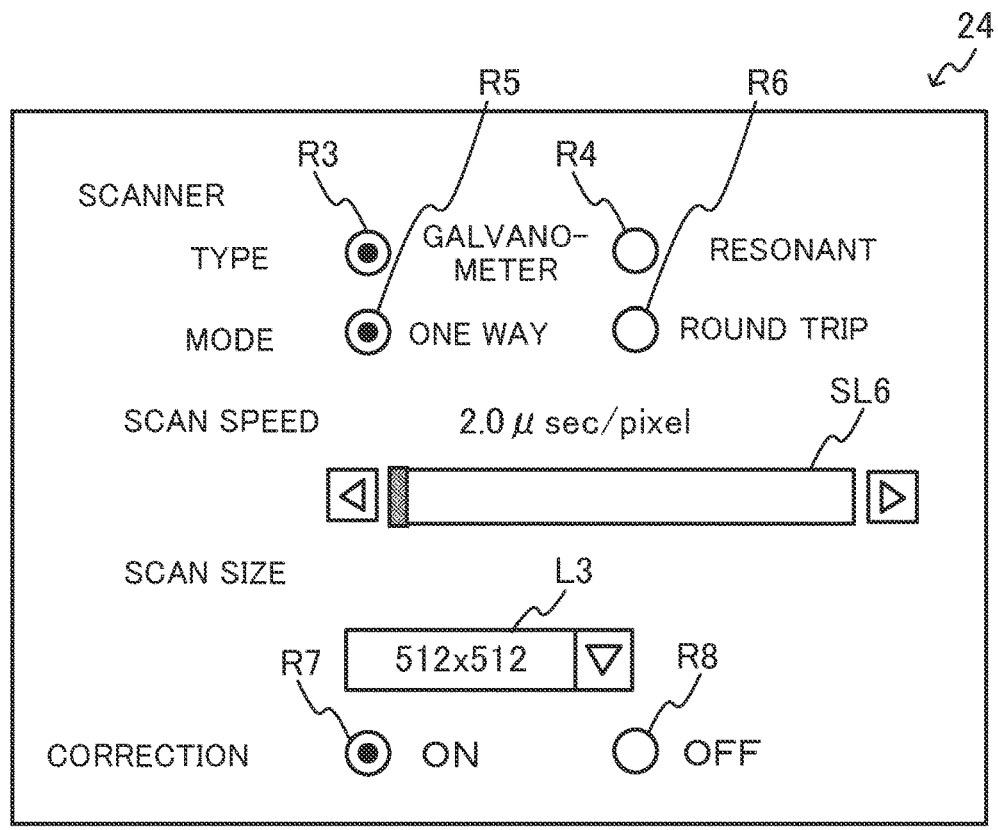
FIG. 10 is a diagram illustrating an example of a scan setting screen.
Figure 11:
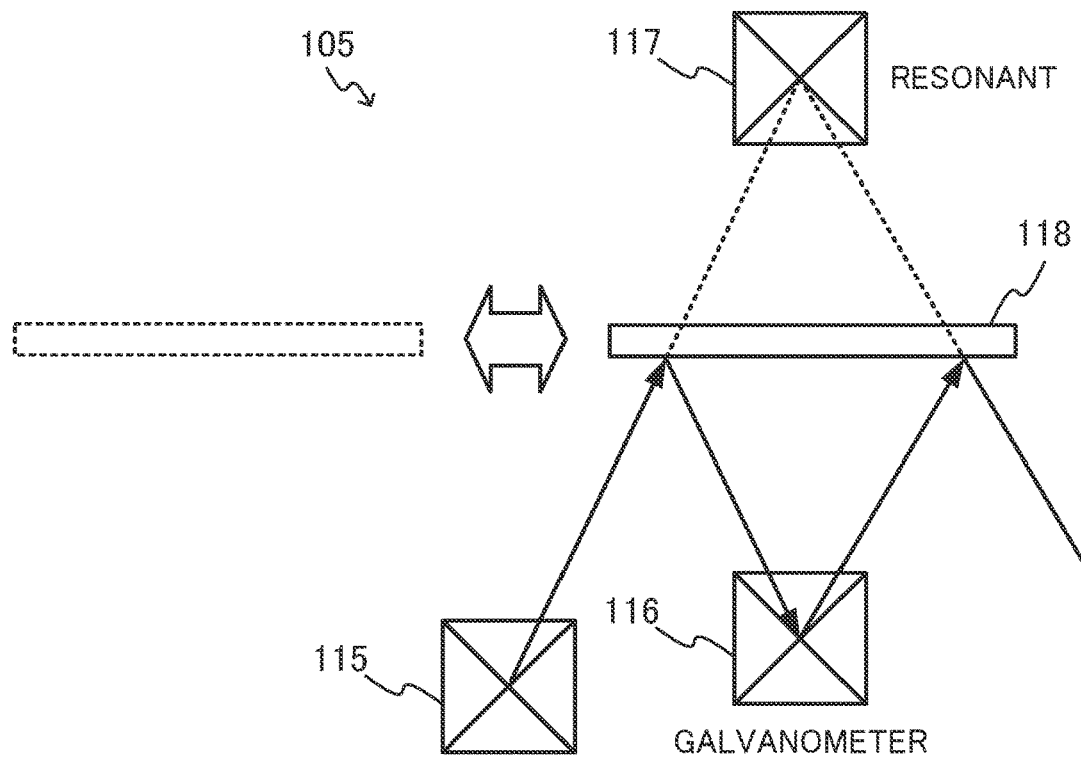
FIG. 11 is a diagram for describing an example of a method of switching the scanner.

FIG. 3 is a flowchart of processing according to the present embodiment performed by the image processing system 1. FIG. 4 is a diagram illustrating an example of a setting screen. FIG. 5 is a diagram illustrating an example of a relationship between an input gradation and an output gradation of a LUT. FIG. 6 is a diagram illustrating an example of a screen for inputting information for calculating a recommended value. FIG. 7 is a diagram for describing an example of a method of calculating an identification range from a histogram. FIG. 8 is a diagram illustrating an example of a screen for inputting information for setting invalid pixels. FIG. 9 is a diagram for describing an example of a method of updating a histogram. FIG. 10 is a diagram illustrating an example of a scan setting screen. FIG. 11 is a diagram for describing an example of a method of switching the scanner. Hereinafter, processing according to the present embodiment performed by the image processing system 1 will be described with reference to FIGS. 3 to 11.

In the present embodiment, as illustrated in FIG. 3, the image processing system 1 first sets an observation condition before actual imaging (step S1). Thereafter, the image processing system 1 performs the actual imaging under the set observation condition (step S2), and finally stores the data of the imaging result (step S3).

In step S1, the processor 11 of the computer 10 displays a screen 21, which is a setting screen, on the display device 20, for example. As illustrated in FIG. 4, a plurality of graphical user interface (GUI) components are disposed on the screen 21. In addition to the plurality of GUI components, a second image obtained by converting the first image acquired by the optical device 100 based on the identification range may be displayed on the screen 21. By displaying the second image, the user can change the observation condition by operating the plurality of GUI components while viewing the second image. The user can search for a desired observation condition by observing a change in the second image due to a change in the observation condition. Note that the observation condition includes, for example, operation settings of components (scanning unit 105, laser 107, PPD 111, etc.) of the optical device 100, image processing settings, and the like.

A list box L1 is a component for changing the detection channel. In a case where the optical device 100 includes a plurality of photodetectors (detection channels), the detection channel can be changed using the list box L1. FIG. 4 illustrates a state in which a first channel (CH1) is selected. The first channel is, for example, the PPD 111. Note that, in this example, an example in which a single channel is selected has been described, but a plurality of channels may be selected and used simultaneously.

A button B11 and a button B12 are repeat buttons. When the button B11 is pressed, the repeat scan is started, and the button B12 is displayed on the screen 21. Further, when the button B12 is pressed, the repeat scan is ended, and the button B11 is displayed on the screen 21. That is, the button B11 indicates a state in which the repeat scan is not being executed, and the button B12 indicates a state in which the repeat scan is being executed. In a state where the button B12 is displayed, the latest image (second image) of the sample photographed by the repeat scan is displayed on the screen 21. Note that the repeat scan is processing in which the scanning unit 105 repeatedly scans a sample, and the image displayed on the display device 20 is updated as needed by executing the repeat scan.

A list box L2 is a component for changing the wavelength of the laser light emitted from the laser 107. FIG. 4 illustrates a state in which 445 nm is selected as the laser wavelength. A text box T1 and a slider SL1 are components for setting the output of the laser 107, and constitute a light source output region for setting the output of the laser 107. FIG. 4 illustrates a state in which the output of the laser 107 is 0. The output can be adjusted by changing the numerical value in the text box T1 or sliding the slider SL1.

A text box T2 and a slider SL2 are components for setting a digital gain in the digital amplifier 114, and constitute a region for setting the digital gain. FIG. 4 illustrates a state in which the digital gain is 1×. The digital gain can be adjusted by changing the numerical value in the text box T2 or sliding the slider SL2.

A text box T3 and a slider SL3 are components for setting an offset of the intensity signal output from the PPD 111, and constitute a region for setting the offset. FIG. 4 illustrates a state in which the offset is 0% of the predetermined value. The offset can be adjusted by changing the numerical value in the text box T3 or sliding the slider SL3.

A text box T4 and a slider SL4 are components for setting the upper limit of the identification range, and constitute an upper limit region for setting the upper limit of the identification range. FIG. 4 illustrates a state in which the upper limit of the identification range is 2000. A text box T5 and a slider SL5 are components for setting the lower limit of the identification range, and constitute a lower limit region for setting the lower limit of the identification range. FIG. 4 illustrates a state in which the lower limit of the identification range is 1000. The screen 21 illustrated in FIG. 4 illustrates a state in which the upper limit region and the lower limit region are included and the identification range is set from 1000 to 2000. The identification range can be adjusted by changing the numerical values in the text box T4 and the text box T5 or sliding the slider SL4 and the slider SL5.

When the identification range is adjusted, the processor 11 updates the LUT 13 stored in the memory 12. For example, when the identification range is set from 1000 to 2000 as illustrated in FIG. 4, the LUT 13 is updated to the relationship between the input gradation and the output gradation illustrated in graph G3 as illustrated in FIG. 5. More specifically, input gradation values 1000 and lower are associated with output gradation 0, input gradation values 1000 to 2000 are linearly associated with output gradation values 0 (minimum gradation value) to 255 (maximum gradation value), and input gradation values 2000 and higher are associated with output gradation 255. By using the LUT 13 having the relationship illustrated in graph G3, it is possible to display the second image in which the gradation range from 1000 to 2000 in the first image is enlarged to the gradation range from 0 to 255. In addition, here, the gradation range of the second image is set to a range of 0 to 255 in accordance with the display gradation range of a general display device, but the gradation range of the second image may be appropriately set in accordance with the display gradation range of the display device. For example, when the display gradation range of the display device is a range of 12 bits and 0 to 4095, the gradation range of the second image may also be set to 0 to 4095.

The upper limit region and the lower limit region constitute an identification range region for setting an identification range. Since the upper limit region and the lower limit region are included in the screen 21, the upper limit and the lower limit of the identification range can be set independently, so that the identification range can be adjusted with a high degree of freedom. In addition to the identification range region, the screen 21 includes an adjustment region for adjusting the second image arranged close to the identification range region. FIG. 4 illustrates an example in which the adjustment region includes a region in which the output of the laser 107 is set, a region in which the digital gain is set, and a region in which the offset is set, but the adjustment region may include at least one of a region in which the output of the laser 107 is set, a region in which the digital gain is set, and a region in which the offset is set. By including the adjustment region close to the identification range region, various settings for contrast adjustment of an image can be collectively performed on one screen, and a system with high operability can be provided.

Although the GUI components included in the identification range region and the adjustment region can be manually operated using the input device 30, the processor 11 may set initial values for these GUI components. For example, the processor 11 may display the initial value of the upper limit of the identification range in the upper limit region and the initial value of the lower limit of the identification range in the lower limit region. By setting an appropriate initial value, it is possible to display an image of a sample having a high contrast to some extent before the contrast is adjusted by the user's operation. Therefore, since the subsequent contrast adjustment can be performed in a relatively short time without excessively increasing the output of the laser 107, damage to the sample occurring in the step of setting the observation condition can be suppressed. In particular, when the image processing system 1 is used for fluorescence observation, it is possible to suppress fading of the sample.

The initial value of the upper limit of the identification range may be, for example, a preset value determined in advance or a recommended value to be described later. Furthermore, the initial value of the lower limit of the identification range may be, for example, a preset value determined in advance, or may be a value corresponding to the gradation of the intensity signal output when light is not incident on the PPD 111. The preset value can be arbitrarily set by the user.

The recommended value is a value calculated by the computer 10 based on the information input by the user. In the image processing system 1, by pressing the button B3, a screen 22 for inputting information for calculating the recommended value illustrated in FIG. 6 is displayed. The screen 22 includes a radio button R1 selected when the recommended value is calculated from the number of photons and a radio button R2 selected when the recommended value is calculated from the applied voltage of the PMT.

A text box T6 is a component for setting the number of photons to be detected, more specifically, the number of photons to be detected per pixel. When the OK button is pressed in a state where the radio button R1 is selected, the processor 11 acquires the number of photons to be detected from the text box T6, calculates a gradation corresponding to the intensity signal output from the PPD 111 when the photons of the acquired number of photons are incident on the PPD 111 as a recommended value, and further displays the calculated recommended value in the upper limit region of the screen 21 as an initial value. As a result, the LUT 13 is updated on the condition that saturation does not occur even when photons of the number of photons to be detected are incident on the PPD 111. Therefore, by using the LUT 13, it is possible to achieve both accurate counting of the number of photons and display of an image with high contrast.

Note that a specific calculation method is, for example, as follows. Assuming that the number of photons to be detected is PH and the gain (that is, the number of gradations per photon) in the PPD 111 is G1, the recommended value is calculated by PH×G1.

A text box T7 is a component for setting the voltage to be applied to the PMT, and more particularly, the voltage to be applied to the PMT to obtain the contrast of the image desired by the user when using a conventional image processing system. When the OK button is pressed in a state where the radio button R2 is selected, the processor 11 estimates the number of photons detectable by the PMT to which the applied voltage indicated in the text box T7 is applied, calculates a gradation corresponding to the intensity signal output from the PPD 111 when the photons of the estimated number of photons are incident on the PPD 111 as a recommended value, and displays the calculated recommended value in the upper limit region of the screen 21 as an initial value. As a result, even a user who is accustomed to a conventional image processing system including the PMT can easily set an appropriate identification range and update the LUT 13. Therefore, it is possible to provide the image processing system 1 with high operability.

Note that a specific calculation method is, for example, as follows. Assuming that the maximum number of gradations of each pixel constituting the second image is SIG, the background intensity is BG, the gain in the PPD 111 is G1, and the gain in the PMT when the voltage acquired from the text box T7 is applied is G2, the recommended value is calculated by (SIG−BG)/G2×G1+BG. Here, the background intensity is a gradation set when light is not incident, and is a value set in advance in the system. By slightly floating the gradation of the background intensity instead of 0, it is possible to avoid that the gradation data becomes 0 or less even if the output signal when light is not incident fluctuates due to a temperature change.

A button B21 and a button B22 are automatic setting buttons. When the button B21 is pressed, automatic setting of the identification range is enabled, and the button B22 is displayed on the screen 21. When the button B22 is pressed, manual setting of the identification range is enabled, and the button B21 is displayed on the screen 21. That is, the button B21 indicates a manual setting state of the identification range, and the button B22 indicates an automatic setting state of the identification range. The button B21 and the button B22 constitute a switching region for switching between manual setting and automatic setting of the identification range. As illustrated in FIG. 4, the screen 21 includes an identification range region for manually setting the identification range and a switching region, and the switching region is arranged close to the identification range region.

When the automatic setting of the identification range is enabled, the processor 11 sets the identification range based on at least the first image, and generates the second image based on at least the set identification range. More specifically, the processor 11 calculates a gradation histogram of pixels constituting the first image, and sets the identification range based on at least the calculated histogram. By calculating the histogram, it is possible to know what kind of gradation pixels the image is composed of, so that the gradation range necessary for the image can be narrowed down to appropriately set the identification range. For example, a range from a minimum value (that is, the minimum gradation value included in the first image) of the gradation distribution represented by the histogram to a maximum value (that is, the maximum gradation value included in the first image) of the gradation distribution may be set as the identification range.

When a noise component is included in the image, the gradation range from the minimum value to the maximum value of the gradation distribution may not be appropriate as the identification range. Therefore, the processor 11 may invalidate a predetermined ratio of pixels in order to eliminate the influence of the noise component, and may set the identification range based on the ratio of the invalid pixels and the histogram. Specifically, as illustrated in FIG. 7, the processor 11 may exclude the number of pixels corresponding to the ratio of invalid pixels from the end of the calculated histogram. That is, as illustrated in graph G4 of FIG. 7, a range from the minimum gradation value to the maximum gradation value of the effective pixels may be set as the identification range. As a result, it is possible to automatically set an appropriate identification range while suppressing the influence of the noise component. Note that FIG. 7 illustrates an example in which the pixels of the top 2% and the bottom 2% are invalidated.

The ratio of invalid pixels may be a preset value determined in advance, or may be arbitrarily set by the user. In the image processing system 1, a screen 23 for inputting information for setting invalid pixels illustrated in FIG. 8 may be displayed by pressing the button B21. The screen 23 includes a histogram H1 of the first image, a color bar Cl indicating the relationship between the gradation and the color displayed on the display device 20, and text boxes T8 to T11.

The text box T8 and the text box T9 are components for setting the minimum value and the maximum value of the identification range, and the minimum gradation value and the maximum gradation value included in the first image are set as initial values. The text box T10 and the text box T11 are components for setting the ratio of invalid pixels. The text box T10 is a component for setting what percentage of pixels from the lower end of the histogram are to be invalidated, and the text box T11 is a component for setting what percentage of pixels from the upper end of the histogram are to be invalidated. FIG. 8 illustrates an example in which the ratio of invalid pixels is set to 0%.

As illustrated in FIG. 8, by letting the user to set the ratio of the invalid pixels on the screen 23 on which the histogram H1 is displayed, it is easy to appropriately invalidate the noise component of the image.

Meanwhile, packets including an intensity signal are exchanged between the optical device 100 and the computer 10. During execution of the repeat scan, that is, during a period in which the scanning unit 105 repeatedly scans, in a case where the automatic setting of the identification range is enabled, the processor 11 desirably updates the histogram based on the intensity signal corresponding to one frame every time the packet is received. As a result, since the identification range can be set based on the latest information, an appropriate range can be set as the identification range.

However, the data size of the signal intensity included in one packet varies depending on the pixel integration time, the image size, the scan mode, the number of simultaneous use channels, and the like so that image transfer and image display are performed at appropriate time intervals. This is because if the data size of the signal intensity included in one packet becomes too large, the update frequency of the image becomes low, and the image display becomes unnatural. In addition, if the data size of the signal intensity included in one packet becomes too small, the image update frequency increases, but the transfer load and the display load increase.

Therefore, as illustrated in FIG. 9, the signal intensity included in one packet P may be less than data corresponding to one frame, and may be, for example, only data corresponding to one line. In such a case, it is desirable to acquire the signal intensity corresponding to one frame by adding the signal intensity extracted from the previously received packet to the signal intensity extracted from the latest packet, and to update the histogram based on the acquired signal intensity corresponding to one frame. As a result, the histogram and the LUT 13 can be updated as needed even when an image is acquired with a laser scanning microscope that takes time to scan a sample and as a result, it takes time to generate an image for one frame. Therefore, it is possible to always display an image of a sample having an appropriate contrast.

Note that the signal intensity extracted from the previously received packet is desirably extracted in order from the latest one. As a result, the histogram can be updated based on the signal intensity corresponding to one frame including the latest signal intensity of each line. However, until the signal intensity corresponding to the first one frame is transmitted from the optical device 100 to the computer 10, the histogram may be created and updated based on the already transmitted signal intensity of less than one frame.

Conversely, one packet may include signal intensity of one or more frames. In such a case, it is desirable that the processor 11 extract the signal intensity corresponding to one frame by decimating a part of the signal intensity included in the packet, and update the histogram based on the extracted signal intensity. For example, the histogram may be updated based on the signal intensity of the latest frame included in the packet.

As described above, in step S1, the image processing system 1 can search for a desired observation condition on the screen 21 displayed on the display device 20 and update the LUT 13. Thereafter, in a case where the actual imaging in step S2 is performed without changing the observation condition, the image processing system 1 converts the first image acquired in the actual imaging into the second image using the LUT 13 and displays the second image on the display device 20. Then, in the final step S3, the memory 12 stores at least one of the first image and the second image and the identification range in association with each other. The memory 12 may store at least a combination of an image and an identification range. Since the LUT 13 includes information on the identification range, the memory 12 may store the LUT 13 in association with the image instead of the identification range. Note that, although the case where the setting of the identification range is the automatic setting has been described so far, even when the automatic setting of the identification range is disabled, that is, when the setting of the identification range is manually performed by a user operation, the gradation histogram of the pixels constituting the first image may be calculated. In this case, the processor calculates the histogram during the repeat scan, and displays the calculated histogram on the display device 20 at any time, so that the user can accurately adjust the brightness of the image while viewing the histogram.

Incidentally, it is desirable to complete the observation condition setting in step S1 in as short a time as possible. For this reason, during the search for the observation condition, the scanning unit 105 is usually operated with the setting capable of acquiring the image in a shorter time than the setting at the time of actual imaging. In such a case, after the end of the search, the operation setting (hereinafter, referred to as scan setting) of the scanning unit 105 is changed to the actual imaging, and then the actual imaging is performed.

However, when the scan setting is changed, the pixel integration time changes, and thus the brightness of the acquired image changes. Therefore, when the gradation conversion is performed on the image acquired in the actual imaging using the LUT 13 generated in step S1, the image displayed on the display device 20 may not have the expected contrast. Note that the pixel integration time is an exposure time per pixel, and depends on a scanning time per pixel.

Therefore, when the scan setting is changed, the image processing system 1 may correct the identification range in accordance with the change in the scan setting, and may update the LUT 13 based on the corrected identification range. Specifically, for example, the identification range may be automatically corrected according to the scan setting by selecting the radio button R7 on the scan setting screen illustrated in FIG. 10 to enable correction.

In the image processing system 1, by pressing the button B4, a screen 24 which is a scan setting screen illustrated in FIG. 10 is displayed. The screen 24 includes GUI components (radio button R3 and radio button R4) for selecting the type of the scanner, GUI components (radio button R5 and radio button R6) for selecting the operation mode of the scanner, a slider SL6 which is a GUI component for setting the scan speed, a list box L3 which is a GUI component for setting the scan size, and GUI components (radio button R7 and radio button R8) for switching the validity and invalidity of the automatic correction of the identification range.

For example, as illustrated in FIG. 11, the scanning unit 105 includes a galvanometer scanner 116 and a resonant scanner 117 that scan a sample in an X direction (a scanning line direction of an image), and a galvanometer scanner 115 that scans a sample in a Y direction orthogonal to the X direction. On the screen 24, by selecting the radio button R3, a reflector 118 is inserted on the optical path such that light is guided to the galvanometer scanner 116 in the scanning unit 105. On the other hand, by selecting the radio button R4, the reflector 118 is removed from the optical path so that the light is guided to the resonant scanner 117 in the scanning unit 105. Since the resonant scanner 117 operates at a higher speed than the galvanometer scanner 116, when the radio button R4 is selected, the pixel integration time becomes shorter than when the radio button R3 is selected. On the screen 24, the pixel integration time also changes when the scan mode, the scan speed, and the scan size are changed. However, changing the scan size changes the pixel integration time only when the scan type is a resonant scanner, and changing the scan mode changes the pixel integration time only when the scan type is a galvanometer scanner.

When the scan setting is changed on the screen 24 in a state where the automatic correction of the identification range is enabled, the pixel integration time (exposure time per pixel) is changed, and thus the processor 11 corrects the identification range based on at least the pixel integration time before and after the change. For example, in a case where the pixel integration time is doubled, the processor 11 may correct the identification range by changing the upper limit and the lower limit of the identification range to half values. As a result, it is possible to omit manual resetting of the identification range accompanying the change of the scan setting.

As described above, according to the present embodiment, it is possible to easily adjust the contrast of the image while enjoying various advantages obtained by employing the PPD 111.

Note that, in the present embodiment, an example has been described in which the identification range is corrected in response to the change in the scan setting. However, the processor 11 is not limited to the change in the scan setting, and may correct the identification range in response to the change in the pixel integration time.

Furthermore, in the present embodiment, an example has been described in which the identification range is corrected based on the pixel integration time before and after the change. However, in a case where other parameters also vary with the change of the scan setting, the processor 11 may correct the identification range in consideration of parameters other than the pixel integration time. For example, in a case where the background intensity, the digital and analog gains, and the maximum number of gradations of the first image (intensity signal) are changed in accordance with the scan setting change, the identification range may be corrected in consideration of these.

Specifically, when the upper limit of the identification range before the change is MAXB, the upper limit of the identification range after the change is MAXA, the pixel integration time before the change is PITB, the pixel integration time after the change is PITA, the background intensity before the change is BGB, the background intensity after the change is BGA, the gain before the change is GB, the gain after the change is GA, the maximum number of gradations before the change is GDB, and the maximum number of gradations after the change is GDA, the upper limit of the identification range after the change may be calculated by the following equation.

$$MAXA = (MAXB - BGB) \times (PITA/PITB) \times (GDA/GDB) \times (GA/GB) + BGA$$

Figure 12:
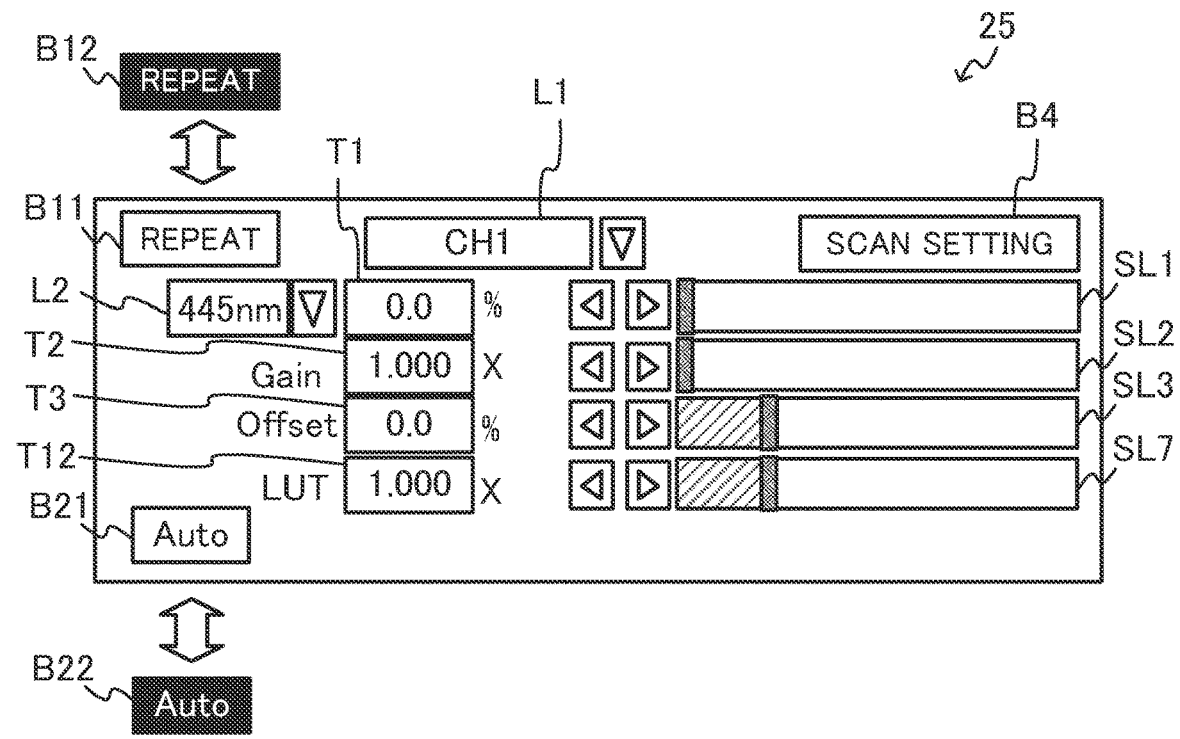
FIG. 12 is a diagram illustrating a modification of the setting screen.

FIG. 12 is a diagram illustrating a modification of the setting screen. In the present embodiment, the screen 21 illustrated in FIG. 4 is exemplified as the setting screen, but the processor 11 may display a screen 25 illustrated in FIG. 12 on the display device 20 as the setting screen. The screen 25 is different from the screen 21 in that an identification range region includes a text box T12 and a slider SL7.

The text box T12 and the slider SL7 are components for setting the identification range. The identification range can be adjusted by changing the numerical value in the text box T12 or sliding the slider SL7. More specifically, by setting the magnification in the text box T12 or the slider SL7, the lower limit of the identification range is set to the gradation of the background intensity, and the upper limit of the identification range is set to a value obtained by dividing the maximum number of gradations by the magnification.

Also by displaying the screen 25, the user can freely set the identification range, so that the contrast of the image can be easily adjusted. Further, on the screen 25, the moving direction of the slider SL7 (first slider) in which the contrast of the second image increases and the moving direction of the slider SL1 (second slider) in which the contrast of the second image increases are both rightward and coincide with each other. Therefore, it is possible to provide the image processing system 1 in which operability of contrast adjustment is further improved.

Second Embodiment

Figure 13:
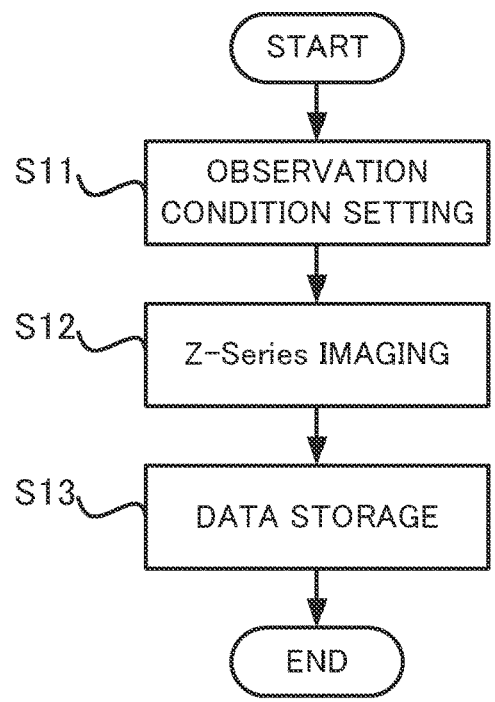
FIG. 13 is a flowchart of processing according to a second embodiment performed by the image processing system 1.
Figure 14:
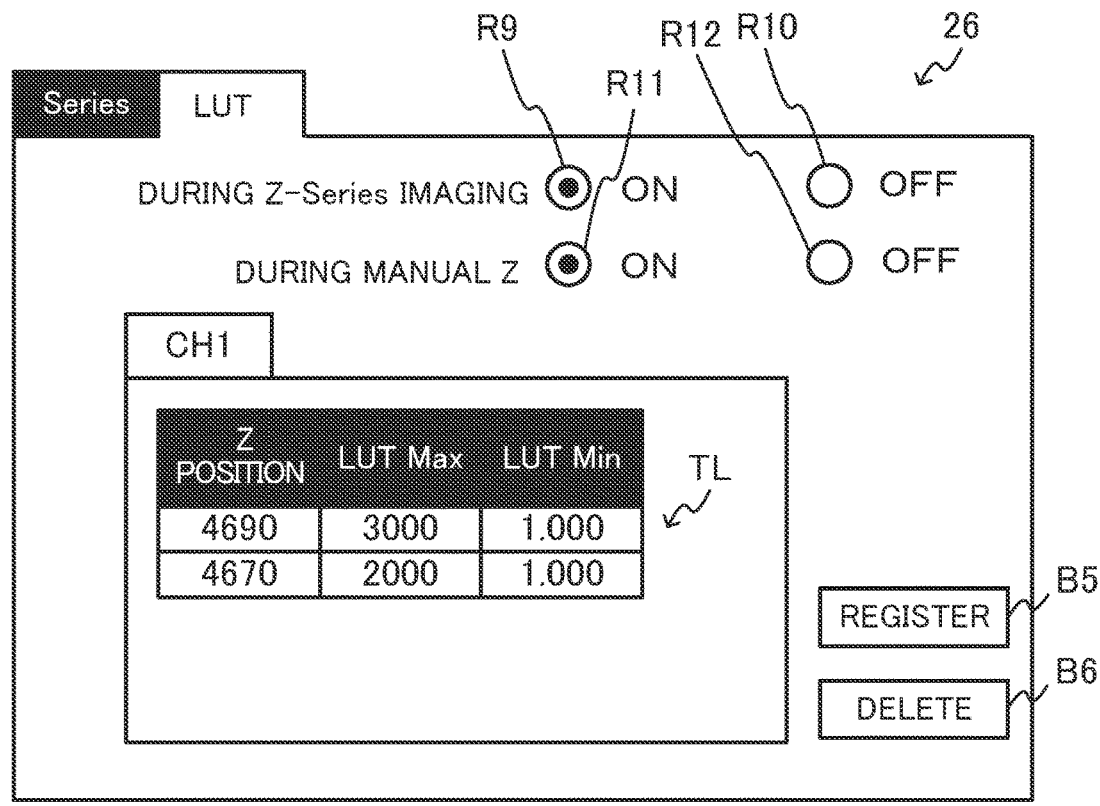
FIG. 14 is a diagram illustrating an example of a screen for setting an identification range for each Z position.
Figure 15:
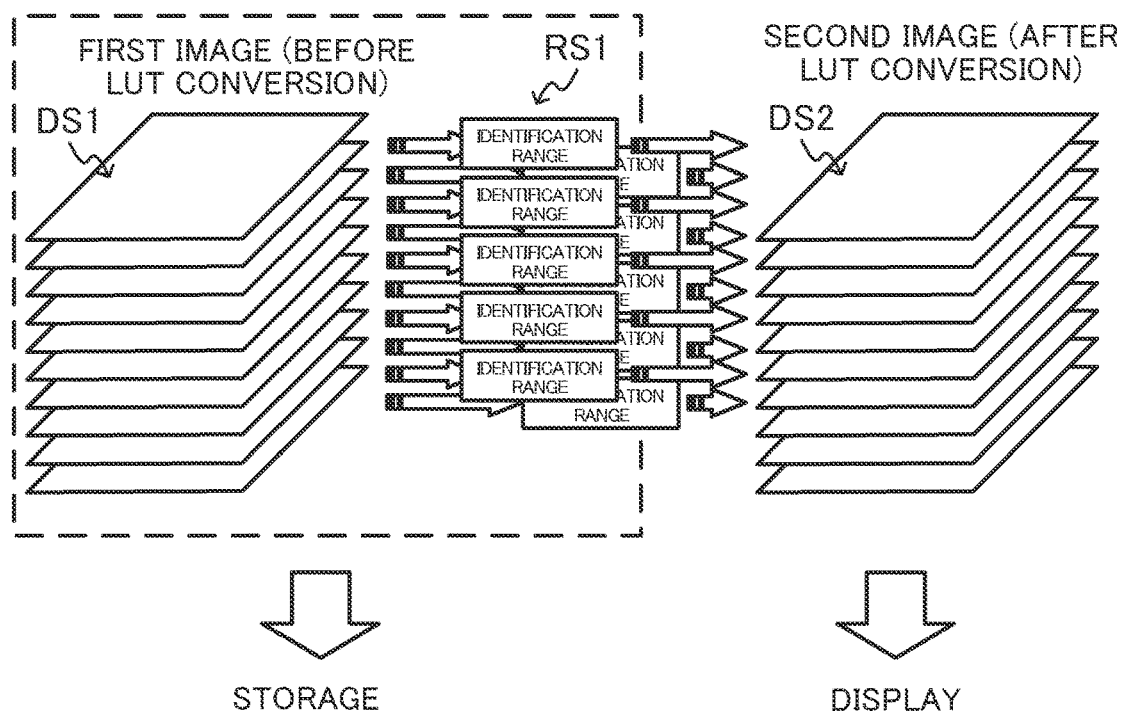
FIG. 15 is a diagram for describing an example of a method of storing an image and an identification range.

FIG. 13 is a flowchart of processing according to the present embodiment performed by the image processing system 1. FIG. 14 is a diagram illustrating an example of a screen for setting an identification range for each Z position. FIG. 15 is a diagram for describing an example of a method of storing an image and an identification range. Hereinafter, processing according to the present embodiment performed by the image processing system 1 will be described with reference to FIGS. 13 to 15.

The processing according to the present embodiment is different from that of the first embodiment in that Z-series imaging is performed in actual imaging. Note that the Z-series imaging is an imaging method of repeating acquisition of a two-dimensional image while moving the observation surface by a predetermined distance in the depth direction, and is used to obtain three-dimensional information of a sample. Z-series imaging is also called Z-stack imaging.

As illustrated in FIG. 13, the image processing system 1 first sets an observation condition before Z-series imaging (step S11). Thereafter, the image processing system 1 performs Z-series imaging under the set observation condition (step S12), and finally stores data of the imaging result (step S13). Hereinafter, each step will be described focusing on a difference from the first embodiment.

In step S11, the processor 11 displays a setting screen on the display device 20, for example, and manually or automatically sets the identification range. This point is similar to step S1 illustrated in FIG. 3. However, the processor 11 is different in that an identification range is set for each observation depth. The processor 11 creates the LUT 13 for each observation depth based on the identification range set for each observation depth, and stores the LUT 13 in the memory 12.

For example, the processor 11 may display a screen 26 illustrated in FIG. 14 as a setting screen. The screen 26 includes a table TL indicating an identification range for each observation depth (Z position) and buttons (button B5 and button B6) for registering and deleting the identification range.

The user controls the focusing device 103 via the computer 10 to set the identification range for at least two different observation depths. Note that the observation depth may be automatically recognized by the processor 11 by, for example, an output from an encoder attached to the focusing device 103. The processor 11 sets the identification range for each observation depth based on a plurality of identification ranges set for at least two different observation depths. More specifically, the processor 11 may set the identification range for each observation depth by linear interpolation based on the plurality of identification ranges. By setting the identification range for each observation depth by linear interpolation, it is possible to greatly reduce the work of setting the identification range, and further, if the sample is homogeneous, it is possible to estimate and set an appropriate identification range with high accuracy.

The screen 26 further includes GUI components (radio button R9 to radio button R12) for setting whether or not to switch and use the LUT 13 for each depth. When the radio button R9 is selected, the processor 11 switches and uses the LUT 13 for each observation depth during Z-series imaging. In addition, when the radio button R11 is selected, the processor 11 switches and uses the LUT 13 for each depth while manually operating the focusing device 103.

In step S12, the processor 11 performs Z-series imaging, and in a case where the radio button R9 is selected, as illustrated in FIG. 15, performs gradation conversion processing using the LUT 13 created for each observation depth. In general, the brightness of the image becomes darker as the observation depth becomes deeper, but by performing the gradation conversion processing using the LUT 13 created for each observation depth, it is possible to display an image having a high contrast regardless of the observation depth.

In step S13, as illustrated in FIG. 15, the memory 12 stores the first image before gradation conversion and the identification range corresponding to the observation depth of the first image in association with each other. That is, the memory 12 stores an image group DS1 including a plurality of first images acquired by Z-series imaging and an identification range group RS1 including a plurality of identification ranges set for observation depths different from each other. Note that the LUT 13 may be stored instead of the identification range. By storing the first image and the identification range or the LUT 13 in association with each observation depth, the image processing system 1 can create and display the second image as necessary while securing raw information before gradation conversion.

Also in the present embodiment, similarly to the first embodiment, it is possible to easily adjust the contrast of the image while enjoying various advantages obtained by employing the PPD 111.

Figure 16:
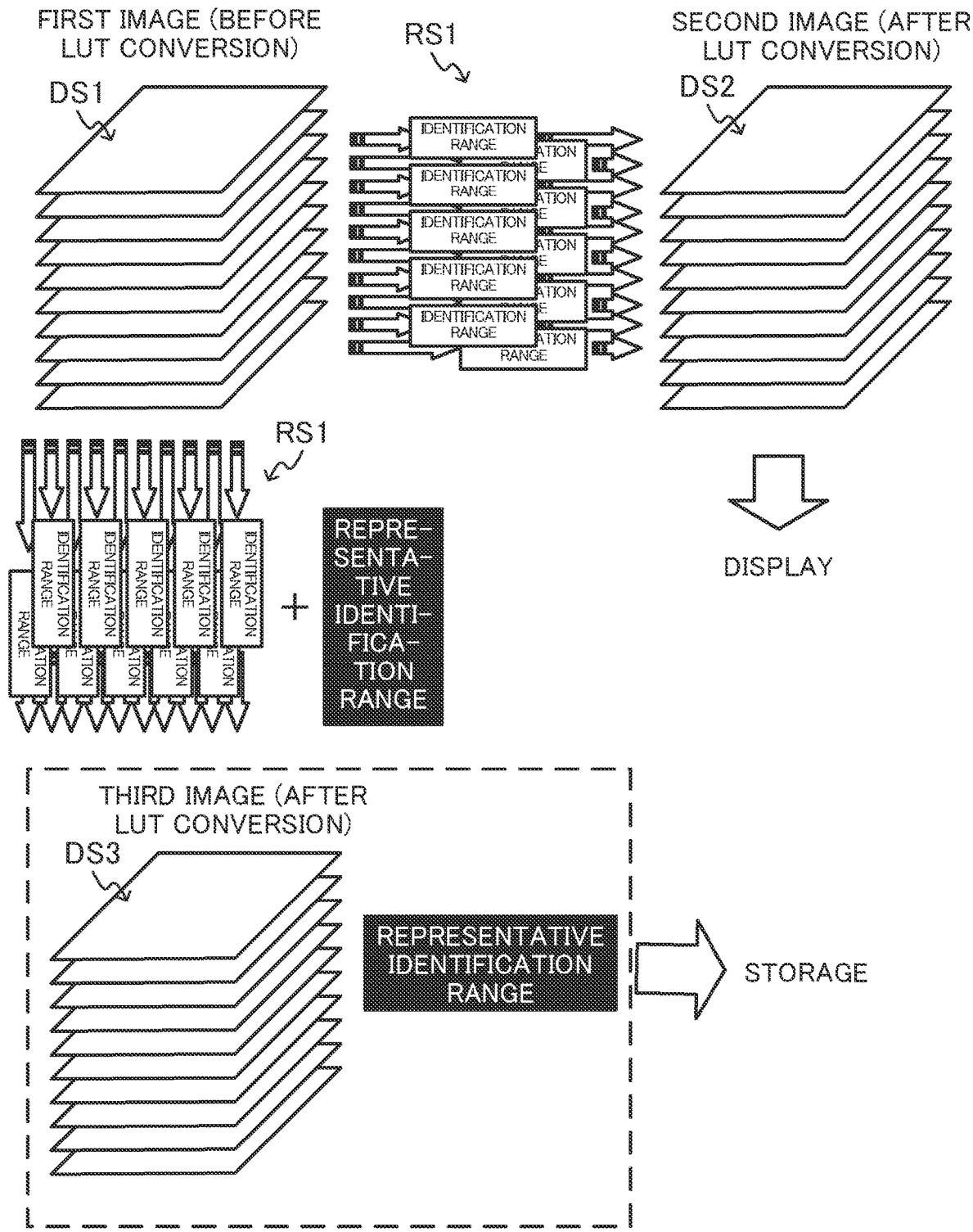
FIG. 16 is a diagram for describing another example of a method of storing an image and an identification range.

FIG. 16 is a diagram for describing another example of a method of storing an image and an identification range. In the present embodiment, an example in which the first image before gradation conversion and the identification range corresponding to the observation depth of the first image are stored in association with each other has been described, but the combination of the image and the identification range is not limited to this example.

For example, as illustrated in FIG. 16, the processor 11 determines one identification range included in the identification range group RS1 as a representative identification range. Note that the representative identification range is not limited to the identification range included in the identification range group RS1, and may be any identification range. Thereafter, the processor 11 generates an image group DS3 by performing gradation conversion processing on the image group DS1 using the identification range group RS1 and the representative identification range. The intensity of each pixel of the image group DS3 is calculated by the following equation, where the minimum value and the maximum value of the representative identification range are denoted by Min and Max, respectively, and the minimum value and the maximum value of the identification range corresponding to each observation depth are denoted by MinZ and MaxZ, respectively.

$$\text{Intensity after conversion} = (\text{intensity before conversion} - \text{MinZ}) \times (\text{Max} - \text{Min})/(\text{MaxZ} - \text{MinZ}) + \text{Min}$$

Note that, as a method by which the processor 11 determines the representative identification range, the processor 11 may determine the identification range specified by the user from the identification range group RS1 as the representative identification range. In the identification range group RS1 of the image group DS1 including the plurality of first images acquired by the Z-series imaging, the processor 11 may automatically determine the identification range of the image having the largest difference between the minimum value and the maximum value of the identification range as the representative identification range. In the image at the Z position in which the identification range wider than the representative identification range is set, the gradation of the raw data is compressed, and the advantage of PPD having sensitivity to one photon cannot be sufficiently utilized. On the other hand, by setting the widest identification range as the representative identification range, there is no image having an identification range wider than the representative identification range, so that it is possible to prevent the gradation of the raw data of the image at each Z position from being compressed.

As illustrated in FIG. 16, the memory 12 may store each image constituting the image group DS3 and the representative identification range in association with each other. Also in this case, since the image group DS2 can be generated by performing the gradation conversion processing on the image group DS3 using the representative identification range, the second image can be created and displayed as necessary.

The above-described embodiments illustrate specific examples for facilitating understanding of the invention, and the embodiments of the present invention are not limited thereto. The image processing system and the image processing method can be variously modified and changed without departing from the scope of the claims.

In the above-described embodiments, the example in which the identification range is set based on the image acquired by the repeat scan has been described, but the identification range may be set based on a still image, particularly, a still image acquired after the repeat scan.

In the above-described embodiments, the method of contrast adjustment of linearly allocating the identification range to the maximum gradation range using the LUT has been exemplified, but the exemplified contrast adjustment may be performed in combination with gamma correction.

In the above-described embodiments, the description has been given focusing on the contrast adjustment method by setting the identification range. However, in a case where the intensity signal is weak as a whole, the above-described contrast adjustment may be performed after the digital gain is adjusted.

In the above-described embodiments, an example in which the identification range for each observation depth is calculated by interpolation has been described, but interpolation should be interpreted in a broad sense. The interpolation includes not only interpolation but also extrapolation.

What is claimed is:

1. An image processing system comprising:
 a scanner;
 a pixelated photon detector (PPD); and
 at least one processor, wherein
 the at least one processor is further configured to:
 display a setting screen on a display unit, the setting screen being a screen for setting an identification range that is a range of gradations to be identified; and
 display a second image obtained by converting a first image on the display unit, the second image being an image obtained by converting the first image based on at least the identification range,
 the first image being generated based on an intensity signal of light detected by the PPD and a scanning position by the scanner.

2. The image processing system according to claim 1, wherein
 the at least one processor is configured to perform a conversion of the first image into the second image, the conversion of the first image into the second image being performed based on information in which an input gradation range having the identification range and an output gradation range calculated by the number of bits of each pixel constituting the second image are associated with each other.

3. The image processing system according to claim 1, wherein
 the setting screen includes:
 an upper limit region for setting an upper limit of the identification range; and
 a lower limit region for setting a lower limit of the identification range.

4. The image processing system according to claim 3, wherein
 the at least one processor is configured to:
 display an initial value of the upper limit of the identification range in the upper limit region; and
 display an initial value of the lower limit of the identification range in the lower limit region.

5. The image processing system according to claim 4, wherein
 the at least one processor is configured to:
 acquire a voltage that will be applied to a photomultiplier tube (PMT) when an image processing system including the PMT is used, the voltage being a voltage for obtaining a contrast of an image desired by a user;
 estimate the number of photons detectable by the PMT to which the voltage is applied; and
 display an initial value of the upper limit in the upper limit region, the initial value being a gradation corresponding to an intensity signal output from the PPD when photons of the number of photons are incident on the PPD.

6. The image processing system according to claim 4, wherein
 the at least one processor is configured to:
 acquire the number of photons to be detected; and
 display an initial value of the upper limit in the upper limit region, the initial value being a gradation corresponding to an intensity signal output from the PPD when photons of the number of photons are incident on the PPD.

7. The image processing system according to claim 1, wherein
 the setting screen includes:
 an identification range region for setting the identification range; and
 an adjustment region that is disposed close to the identification range region and adjusts the second image.

8. The image processing system according to claim 1, wherein
 the setting screen includes:
 an identification range region including a first slider that sets the identification range; and
 a light source output region including a second slider that is disposed close to the identification range region and sets an output of a light source, and a moving direction of the first slider in which contrast of the second image is increased coincides with a moving direction of the second slider in which contrast of the second image is increased.

9. The image processing system according to claim 1, wherein
when automatic setting of the identification range is enabled, the at least one processor is configured to
set the identification range based on at least the first image.

10. The image processing system according to claim 9, wherein
the at least one processor is configured to:
calculate a gradation histogram of pixels constituting the first image; and
set the identification range based on at least the histogram.

11. The image processing system according to claim 10, wherein
the at least one processor is configured to:
acquire a ratio of pixels to be invalidated; and
exclude data of the number of pixels corresponding to the ratio from an end of the histogram.

12. The image processing system according to claim 10, wherein
the at least one processor is configured to perform an update of the histogram based on an intensity signal corresponding to one frame every time a packet including an intensity signal is received, the update being performed during a period in which the scanner repeatedly scans.

13. The image processing system according to claim 12, wherein
the at least one processor is configured to update the histogram based on an intensity signal corresponding to one frame including a latest intensity signal of each line in a case where an intensity signal included in the packet is less than data corresponding to one frame.

14. The image processing system according to claim 12, wherein
the at least one processor is configured to update the histogram based on an intensity signal of a latest frame included in the packet in a case where the packet includes intensity signals of one or more frames.

15. The image processing system according to claim 9, wherein
the setting screen includes:
an identification range region for manually setting the identification range; and
a switching region that is disposed close to the identification range region and switches between manual setting and automatic setting of the identification range.

16. The image processing system according to claim 1, wherein
the at least one processor is configured to set an identification range for each depth based on a plurality of identification ranges set for at least two different depths.

17. The image processing system according to claim 16, wherein
the at least one processor is configured to set the identification range for each depth by linear interpolation based on the plurality of identification ranges.

18. The image processing system according to claim 1, further comprising:
a memory that stores at least one of the first image and the second image in association with the identification range.

19. The image processing system according to claim 1, wherein
the at least one processor is configured to correct the identification range based on at least exposure time before and after change in a case where exposure time per pixel is changed.

20. An image processing method comprising:
displaying a setting screen on a display unit; and
displaying a second image obtained by converting a first image on the display unit, wherein
the setting screen is a screen for setting an identification range that is a range of gradation to be identified,
the first image is generated based on an intensity signal of light detected by a pixelated photon detector (PPD) and a scanning position by a scanner, and
the second image is an image obtained by converting the first image based on at least the identification range.

* * * * *